(12) United States Patent
Lopez et al.

(10) Patent No.: US 8,333,289 B2
(45) Date of Patent: Dec. 18, 2012

(54) PACKAGE FOR LAUNDRY SCENT ADDITIVE

(75) Inventors: Natalie Vitalia Lopez, Cincinnati, OH (US); Adrian Keith McKinney, Maineville, OH (US); Richard Lawrence Horstman, Cincinnati, OH (US); Kristin Marie Finley, Cincinnati, OH (US); Karen Hussong Strader, Clearcreek Township, OH (US)

(73) Assignee: The Procter & Gamble Company, Cincinnati, OH (US)

( * ) Notice: Subject to any disclaimer, the term of this patent is extended or adjusted under 35 U.S.C. 154(b) by 168 days.

(21) Appl. No.: 12/986,658

(22) Filed: Jan. 7, 2011

(65) Prior Publication Data

US 2012/0175016 A1    Jul. 12, 2012

(51) Int. Cl.
*B65D 51/16* (2006.01)
*B65D 41/56* (2006.01)

(52) U.S. Cl. ........ 215/228; 215/246; 215/307; 220/212; 220/256.1; 220/367.1; 222/480; 206/525; 206/229; 206/205

(58) Field of Classification Search .................. 215/228, 215/246, 307; 220/212, 256.1, 367.1; 222/478, 222/480, 482; 206/205, 229, 497, 525
See application file for complete search history.

(56) References Cited

U.S. PATENT DOCUMENTS

| 4,273,247 | A | * | 6/1981 | Earls | 215/228 |
| 4,834,251 | A | * | 5/1989 | Yu | 215/222 |
| 4,966,780 | A | * | 10/1990 | Hargraves et al. | 426/118 |
| 6,045,833 | A | * | 4/2000 | Landau | 426/2 |
| 6,314,911 | B1 | * | 11/2001 | Kaytovich | 119/61.5 |
| 7,867,968 | B1 | * | 1/2011 | Aouad | 510/296 |

FOREIGN PATENT DOCUMENTS

| EP | 0 391 688 | 10/1990 |
| WO | WO 2005/007523 A1 | 1/2005 |

OTHER PUBLICATIONS

International Search Report for International Application No. PCT/US2012/020249, mailed Mar. 29, 2012, 9 pages.
Printout of photographs of Renuzit Adjustables Cone taken May 19, 2010, 2 pages.

* cited by examiner

*Primary Examiner* — Anthony Stashick
*Assistant Examiner* — James N Smalley
(74) *Attorney, Agent, or Firm* — Gary J. Foose

(57) ABSTRACT

A package for a particulate laundry scent additive.

14 Claims, 6 Drawing Sheets

PACKAGE FOR LAUNDRY SCENT ADDITIVE

FIELD OF THE INVENTION

A package for a particulate laundry scent additive.

BACKGROUND OF THE INVENTION

Many consumers like to enhance the scent of their laundry using various products such as scented detergents, scented sheet or liquid fabric softeners, and additives to the wash. Packaging for laundry products must be robust enough to protect the packaging and the contents therein from damage from the time that the product is placed in the package to when the product is used by the consumer in her home. A common approach to packaging is to make every practical effort to isolate the product in the package from the external environment.

Particulate laundry scent additives can be applied to the wash using a dosing cup that is provided with the packaging. The dosing cup can be snapped onto a closure for the container that houses the particulate laundry scent additive. For instance, the container can be a generally cylindrically shaped bottle having an open end, the bottle being sized and dimensioned to be conveniently gripped by the user as she pours the particulate laundry scent additive from the container. A closure, such as a common screw in cap, can be threadably engaged with the open end of the bottle to prevent the contents of the container from spilling out. A dosing cup can be peripherally snapped to the closure so as to be in a convenient location when the consumer uses the product.

There are at least three problems associated with such a packaging design. First, the dosing cup may become separated from the threaded closure during shipping or while being displayed on a shelf in a retail environment or while stored in the consumer's home. These two packaging components might become separated as a result of the package being dropped during handling or by a person intentionally removing the dosing cup from the closure. If a consumer arrives at the shelf from which she selects the product and does not recognize that the dosing cup is missing from the package, she may purchase an incomplete product and may not be able to fully enjoy the benefits from using the product. Another result of a missing dosing cup might be that the retailer may choose to pull the product from the shelf because of the inability of the retailer to sell the product, which is a financial loss to the retailer or a party further up the supply chain for the product.

A second problem with the packaging design outlined above is that the consumer might be tempted to open up the closure to smell the product to make sure the scent is desirable to her. Such behavior can result in product being spilled or otherwise exposed to the environment.

A third problem with the packaging design outlined above is that the consumer may be required to handle three separate elements when she dispenses the product, the container, the closure, and the dosing cup, with only two hands, which can be inconvenient.

In view of these problems, there is a continuing unaddressed need for packaging for a laundry scent additive that includes a container, a closure, and a dosing cup that is robust enough to endure rough handling without the dosing cup becoming separated from the closure yet provides the consumer with an opportunity to experience the scent of the product at shelf without opening the packaging and can be conveniently delivered to the laundry with only two hands.

SUMMARY OF THE INVENTION

A package comprising: a container, the container having an open end and containing a particulate laundry scent additive, the laundry scent additive comprising free perfume; a closure engaged with an open end of the container, the closure having a peripherally recessed portion; a dosing cup comprising a closed end, a peripheral rim, and a wall extending from the closed end to the peripheral rim to define a dosing volume, the dosing volume in fluid communication with the peripherally recessed portion of the closure, the peripheral rim releasably engaged with the closure, the dosing cup having a longitudinal axis, at least a portion of said dosing volume extending further away from the longitudinal centerline than at least a portion of the peripherally recessed portion of the closure, the wall comprising a tapered portion inwardly tapered towards the longitudinal axis, wherein the dosing cup comprises a vent opening in the closed end or in the wall, wherein the vent opening is sized and dimensioned to retain the particulate laundry scent additive; and a shrink sleeve wrapping around the container and the closure and at least a portion of the tapered portion of the dosing cup wall thereby providing a redundant mechanism of engagement between the dosing cup and the container, wherein the vent opening is unobstructed by the shrink sleeve, wherein the shrink sleeve bridges over at least a portion of the peripherally recessed portion of said closure.

DETAILED DESCRIPTION OF THE INVENTION

Figure 1:
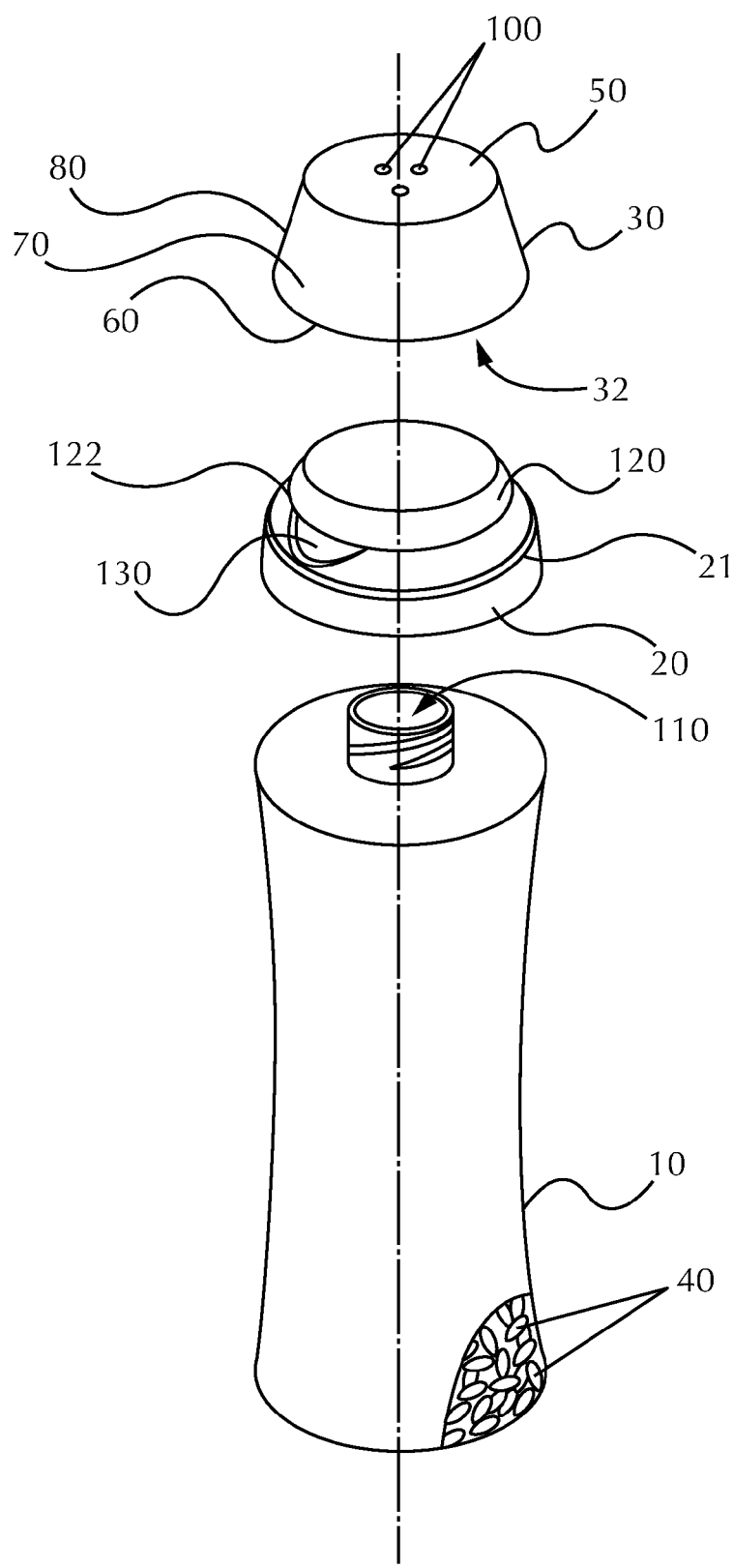
FIG. 1 is a schematic of an exploded perspective view of a package for a particulate laundry scent additive.

A package 5 for a laundry scent additive 40 is shown in FIG. 1. The package 5 can comprise a container 10, a closure 20, a dosing cup 30, and a shrink sleeve that wraps around the container 10, the closure 20, and at least part of the dosing cup 30. The container 10 can be a blow molded plastic bottle made of polyethylene terephthalate or any other material having the capability of being robust during transport and display, including other plastics and paper. The container 10 can be flexible enough such that the container 10 is deformable to a person squeezing the bottle with her hand. The container 10 can have an open end 110 through which the contents of the container 10 can be poured by the consumer.

The container 10 can comprise polyethylene terephthalate and can have a wall thickness of about 0.254 mm. The container 10 can be a generally cylindrical bottle having a height of about 198 mm and a diameter of about 76.2 mm. The container 10 can be generally tapered at mid-height to provide a location on the container 10 that is sized and dimensioned to be gripped by an adult woman. The container 10 can be the bottle that is used for the 26 ounce size of TIDE STAIN RELEASE, marketed by The Procter & Gamble Company, Cincinnati, Ohio, as of Oct. 1, 2010.

The container 10 can contain a particulate laundry scent additive 40 such as that disclosed in U.S. patent application Ser. No. 12/732,576 or any other particulate scented product that can be applied with a dosing cup 30. The particulate laundry scent additive 40 can be a composition that is added into the tub of a washing machine before or during a wash cycle. The particulate laundry scent additive 40 can comprise a material selected from the group consisting of a surfactant, a fabric softener, perfume microcapsules, a perfume, and combinations thereof. The particulate laundry scent additive 40 can be a granular detergent such as any variant of TIDE, marketed by The Procter & Gamble Co., Cincinnati, Ohio, USA, as of Oct. 1, 2010.

The closure 20 can be engaged with the open end of the container 10. The closure 20 can serve to enclose the laundry scent additive 40 within the container 10 such that particles of the laundry scent additive 40 cannot spill out of the container 10 when the closure 20 is engaged with the container 10. The closure 20 can be a flip top cap 120 having a peripherally recessed portion 130. The peripherally recessed portion 130 can be sized and dimensioned to allow the consumer to get at least part of the end of one of her fingers partially under the edge 122 of the flip top cap 120 or under a lift tab protruding from the flip top cap 120 such that she can pry open the flip top cap 120.

After removing the dosing cup 30 from the package 5 and placing the dosing cup 30 in an upright position in her free hand or on a suitable flat surface, the flip top cap 120 can be opened. Once the flip top cap 120 is opened, the consumer can pour the particulate laundry scent additive 40 into the dosing cup 30 that can be held in one of the consumer's hands or resting on a flat surface. The flip top cap 120 can be a separate or integral part of the closure 20 in which the body of the closure 20 and the flip top cap 120 are connected to one another by a hinge, such as a simple hinge or a butterfly hinge that is bi-stable. The flip top cap 120 can have a spud. The spud of the flip top cap 120 can engage with an orifice in the body of the closure 20. The flip top cap 120 can comprise polypropylene.

The dosing cup 30 can comprise a closed end 50, a peripheral rim 60, and a wall 70 extending from the closed end 50 to the peripheral rim 60 to define dosing volume 32. The dosing volume 32 can be between about 10 mL and about 80 mL and can have a generally fustro conical shape, discounting for any decorative features of the shape of the dosing cup 30. The peripheral rim 60 can be releasably engaged with the closure 20. The dosing cup 30 can be engaged to the closure 20 by snapping the peripheral rim 60 of the dosing cup 30 to the closure 20. For example, the closure 20 can have a lip 21 to which the peripheral rim 60 can be frictionally engaged. The diameter of the part of the inner part of the lip 21 can be slightly larger than the diameter of the inner edge of the peripheral rim 60 such that the inner edge of the peripheral rim 60 fits tightly to the lip 21. The dosing cup 30 can engage with the closure 20 using a tongue and groove fitting. The dosing cup 30 can engage with the closure 20 via a constrained hoop in which the peripheral rim 60 of the dosing cup 30 is circumferentially constrained and under circumferential compression in a direction along the peripheral rim 60, much like the way a large cap is engaged with a typical foam shaving cream container.

The dosing cup 30 can have a longitudinal axis L. The longitudinal axis L can be considered to extend through the closure 20 and the container 10. The wall 70 can comprise a tapered portion 80 that is inwardly tapered towards the longitudinal axis L. The dosing cup 30 can be generally fustro conically shaped with the broadest dimension at the open end of the dosing cup 30 defined by the peripheral rim 60 and the narrowest dimension near or at the closed end 50 of the dosing cup 30. The inwardly tapered portion 80 can be adjacent the peripheral rim 60.

The dosing volume 32 can be in fluid communication with the peripherally recessed portion 130 of the closure 20. One way to relate the dosing cup 30 and closure 20 in such a manner is to structure the dosing cup 30 such that at least a portion of the dosing volume 32 extends further away from the longitudinal axis L than at least a portion of the peripherally recessed portion 130 of the closure 20. The objective of providing such a relationship between the dosing volume 32 and peripherally recessed portion 130 of the closure is to provide a conduit for movement of perfumed air that is driven from the container 10 to the peripherally recessed portion 130 of the closure 20, through the dosing volume 32, and out the vent opening 100 to the consumer's nose.

Figure 2:
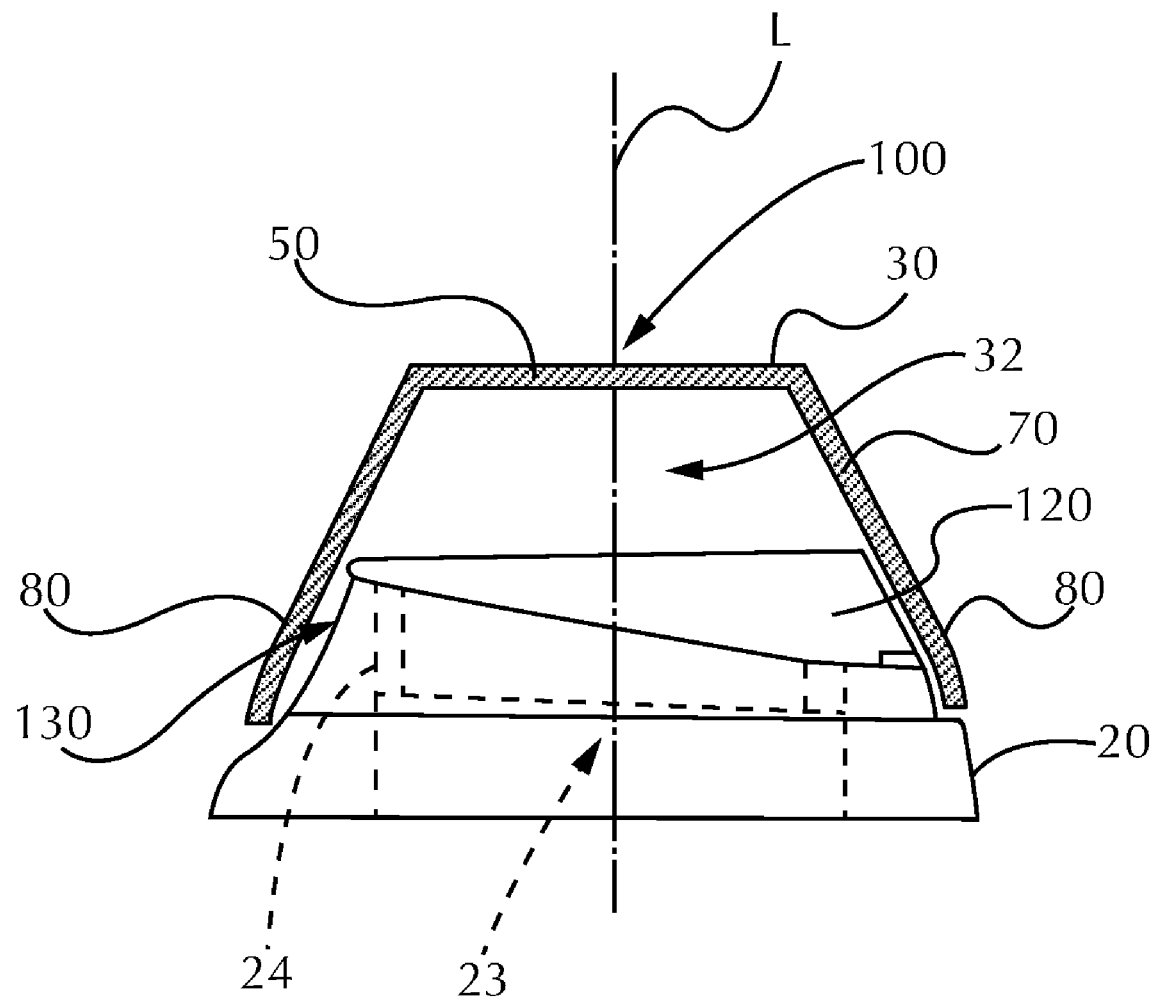
FIG. 2 is a schematic of a side view of a closure and dosing cup, the dosing cup rendered as a cross-section.

FIG. 2 schematically illustrates an embodiment of an arrangement of a dosing cup 30 and a closure 20. The closure 20 illustrated in FIG. 2 has a flip top cap 120. In FIG. 2, the dosing cup 30 is illustrated in cross section and the closure is shown in side view to reveal how the dosing cup 30 and dosing volume 32 can relate to the peripherally recessed portion 130 of the closure 20. As shown in FIG. 2, the dosing cup volume 32 is in fluid communication with the peripherally recessed portion 130 of the closure 20.

By having the dosing cup 30 inwardly tapered adjacent the peripheral rim 60, a shrink sleeve that is applied to the package 5 over the container 10, closure 20, and the inwardly tapered portion 80 of the dosing cup 30, can help to secure the dosing cup 30 to the container 10 such that the dosing cup 30 does not become unintentionally disengaged from the container 10 prior to the consumer first using the particulate laundry scent additive 40. The dosing cup 30 can comprise polypropylene.

The dosing cup 30 can comprise a vent opening 100 in the closed end 50 or wall 70 of the dosing cup 30. The vent opening 100 can serve as a conduit for perfumed air to be expelled from the container 10 towards the consumer's nose. For instance, at the point of purchase, the consumer may desire to experience the scent of the laundry scent additive 40 to make sure she is pleased by the scent. The consumer can squeeze the container 10, which will expel a small quantity of perfumed air through the open end 110 of the container 10, through the orifice of the closure 20, possibly via the interface between the spud 24 and the orifice 23, through the peripherally recessed portion 130 of the closure 20, into the dosing volume 32 of the dosing cup 30, and through the vent opening 100, which will allow the consumer to smell the laundry scent additive 40 in the container 10 without having to open the package 5. Given the sensitivity of a typical consumer's nose, only a small volume of perfumed air, or mass of perfume, need be expelled out the vent opening 100 for the consumer to sufficiently experience the scent of the laundry sent additive 40.

The perfumed air in the container 10 can reside in the interstitial spaces between particles of the laundry scent additive 40 and in any headspace within the container 10. The scent may be provided by perfume that diffuses out of the particles of the particulate laundry scent additive 40. The perfume can be free perfume within the particles of laundry scent additive 40 or perfume from ruptured perfume microcapsules within the laundry scent additive 40.

The vent opening 100 can be sized and dimensioned to retain the particulate laundry scent additive 40. The vent opening 100 can be sized and dimensioned to retain 100% of the particles of a unit dose of the particulate laundry scent additive 40. Such a relationship in size between the vent opening 100 and size of the particles of the particulate laundry scent additive 40 can be helpful for avoiding spilling of the laundry scent additive 40 through the vent opening 100 when a unit dose of the laundry scent additive 40 is poured into the dosing cup 30. The vent opening 100 can be a small slot 0.75 mm wide by 2 mm in length. The vent opening 100 can be a small circular aperture having a diameter between about 0.5 mm and about 3 mm. The vent opening can be a small slot having a length between about 0.5 mm and about 3 mm and a width between about 0.5 mm and about 3 mm. The vent opening 100 can be an aperture molded in the dosing cup 30 or can be an aperture that is formed in the closed end 50 of the dosing cup 30 after molding of the dosing cup 30. The dosing cup 30 can comprise one or more vent openings 100. The vent opening 100 can have the shape of a rectangle and have dimensions of about 39 μm by about 79 μm. The particulate laundry scent additive 40 can be generally spheroid shaped having a diameter between about 4 mm and about 6 mm and an aspect ratio of height to diameter of between about 0.35 and about 0.6. The particulate laundry scent additive 40 can be generally spheroid shaped having a diameter of about 5 mm and an aspect ratio of height to diameter of about 0.5.

Figure 3:
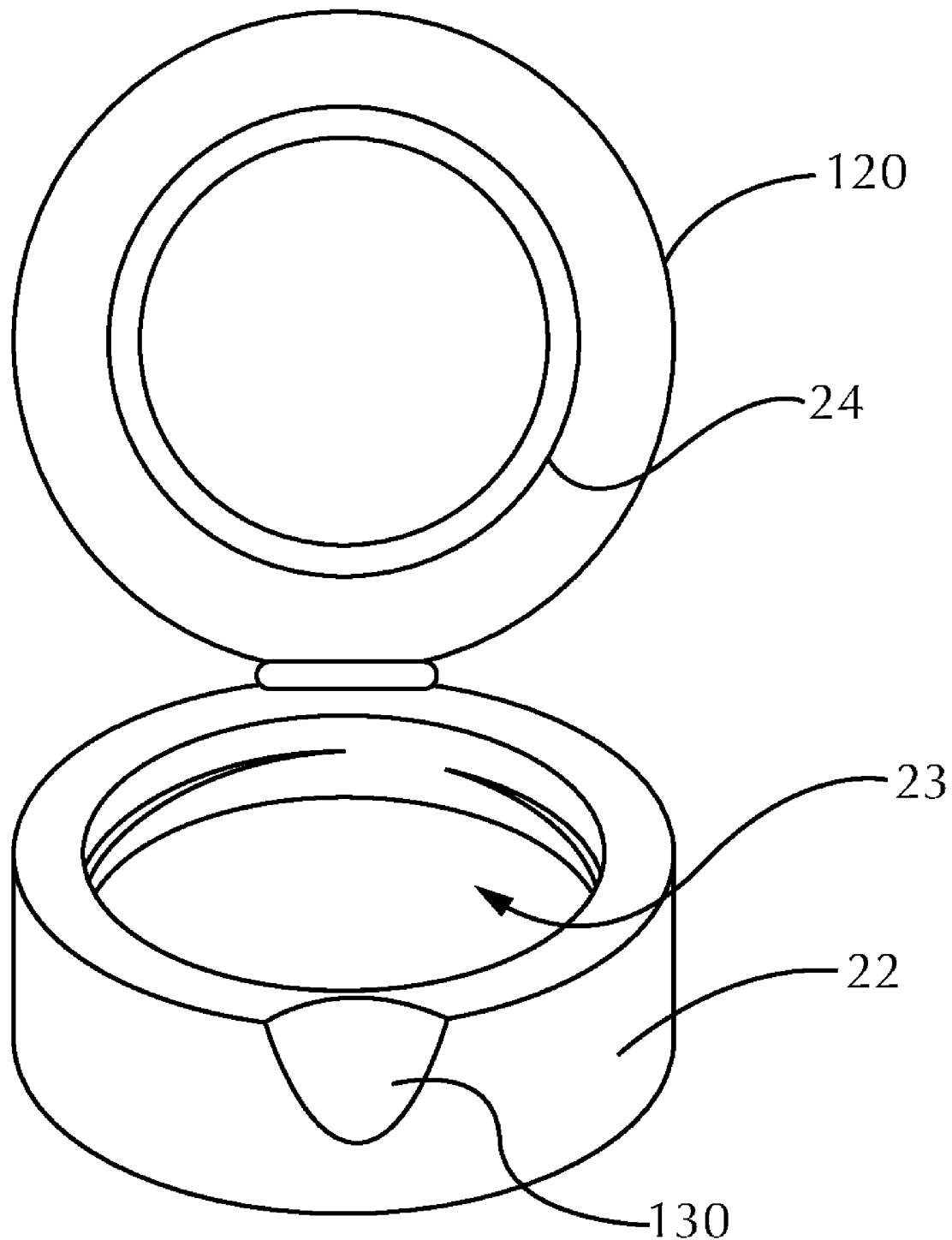
FIG. 3 is a schematic of a perspective view of a closure.

A schematic of a closure 20 in an open position is shown in FIG. 3. As shown in FIG. 3, the closure 20 can comprise a body 22, a peripherally recessed portion 130, and a flip top cap 120 connected to the body 22. The flip top cap 120 can have a portion that is sized and dimensioned to releasably lock into place in the orifice 23 of the body of the closure 20 or the body of the closure 20 itself. A spud 24 can extend from the underside of the flip top cap 120 that is sized and dimensioned to releasably lock, for instance by friction or a tongue and groove, into the orifice 23 of the body so that purposeful effort must be exerted by the consumer to open the closure 20 by flipping open the flip top cap 120. The fit of the spud 24 into the orifice 23 can be sized and dimensioned such that at least some airflow is possible at low pressure at the interface between the spud 24 and the orifice 23 yet the space providing for airflow is sized and dimensioned such that particles of the laundry scent additive 40 cannot fit into the space at the interface between the spud 24 and the orifice 23. The closure 20 can be threadably engaged with the container 10 using a threaded connection, such as complementary threads on the closure 20 and the open end 110 of the container 10.

Figure 4:
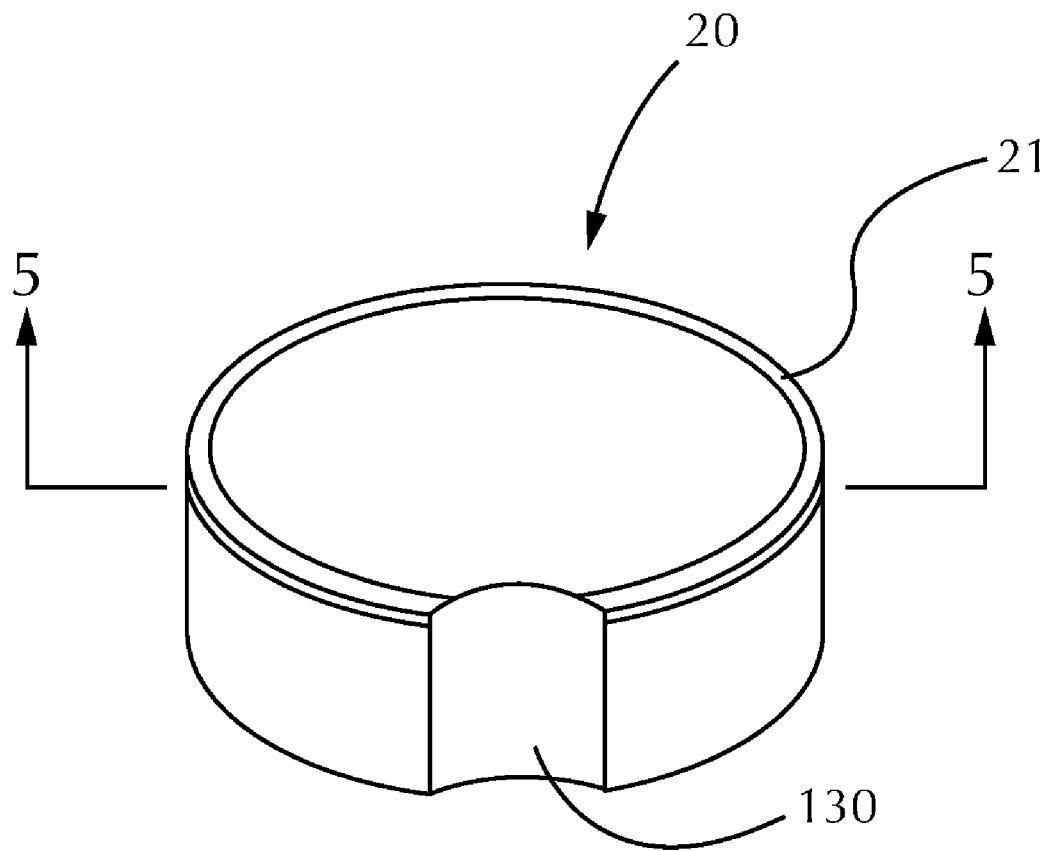
FIG. 4 is a schematic of a perspective view of a closure.
Figure 5:
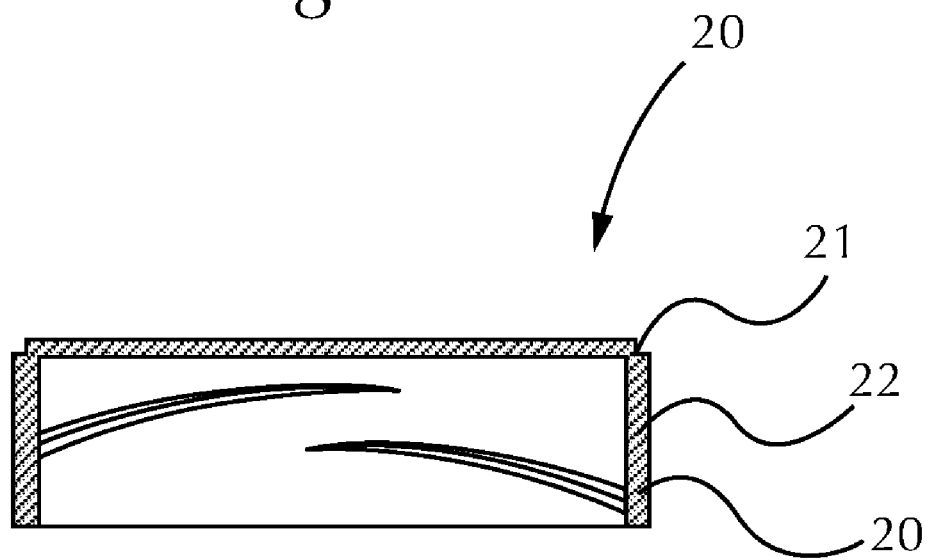
FIG. 5 is a cross section of the closure shown in FIG. 4.

Closure 20 can be a cap such as that shown in FIG. 4. Closure 20 can screw or snap onto or into container 10. The peripherally recessed portion 130 of closure 20 can extend along the entire height of the closure 20, the height being considered parallel with the longitudinal axis L of the dosing cup 30 when the dosing cup 30 is engaged with the closure 20. The peripherally recessed portion 130 of closure 20 can extend along at least an upper portion of the height of the closure 20. A cross section of the closure 20 shown in FIG. 4 is shown in FIG. 5.

Figure 6:
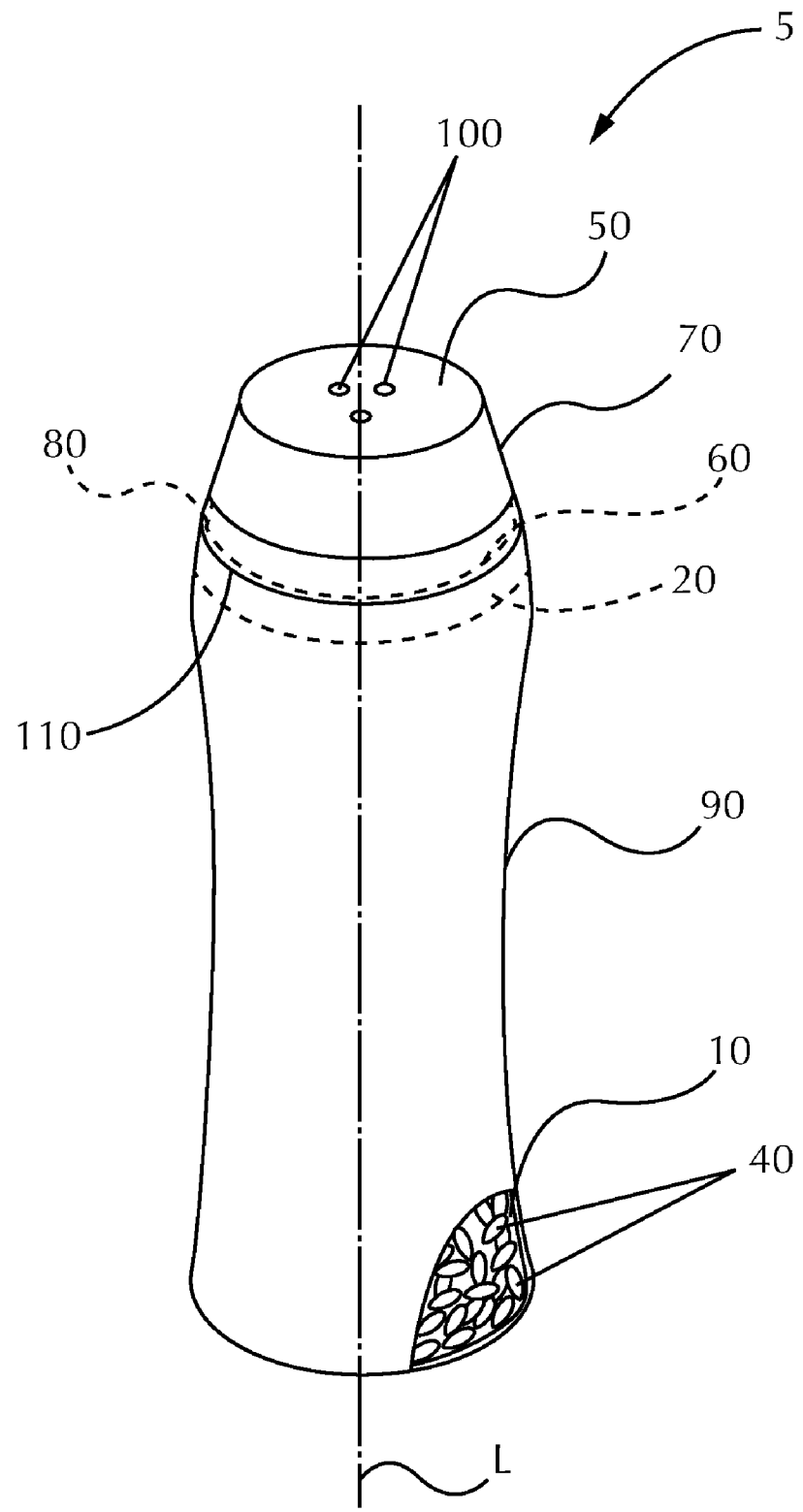
FIG. 6 is a schematic of a perspective view of a package for a particulate laundry scent additive.

The package 5 can comprise a shrink sleeve 90 that wraps around the container 10 and the closure 20 and at least a portion of the tapered portion 80 of the dosing cup 30, as shown in FIG. 6. Suitable shrink sleeves can be formed from, for example, but not limited to, polyvinyl chloride, polyethylene terephthalate with glycol, poly lactic acid—corn based biopolymer such as EARTHFIRST material, oriented polystyrene, or other material known in the art and employed as a shrink sleeve. The shrink sleeve 90 can bridge over at least a portion of the peripherally recessed portion 130 of the closure 20. Such bridging can leave a defined void space between the peripherally recessed portion 130 of the closure 30 and the wall 70 or tapered portion 80 of the dosing cup 30. A defined void space at the location of the peripherally recessed portion 130 may help improve the fluid communication between the peripherally recessed portion 130 and the dosing volume 32 and ultimately to the consumers nose. The shrink sleeve 90 can be polyethylene terephthalate, oriented polystyrene, or polylactic acid or other material commonly used for shrink sleeves. The shrink sleeve 90 can be the same material as used for the shrink sleeve provided in the 26 ounce package of TIDE STAIN RELEASE, marketed by The Procter & Gamble Company, as of Oct. 1, 2010.

The shrink sleeve 90 can provide a redundant mechanism of engagement between the dosing cup 30 and the container 10. In absence of a shrink sleeve 90, the dosing cup 30 is engaged to the closure 20 and the closure 20 is engaged with the container 10, thereby effectively engaging the dosing cup 30 with the container 10. In such an embodiment, the marketer is depending on the integrity of the mechanism of engagement between the dosing cup 30 and the closure 20 to keep the dosing cup 30 from being prematurely or unintentionally separated from the closure 20. If the package 10 is dropped by the person stocking the shelf display, a person shopping for the package 10, or knocked from the shelf, the impact may dislodge the dosing cup 30 from the closure 20. If such an event happens, the dosing cup 30 may be damaged or lost. A damaged or lost dosing cup 30 might be dissatisfying to a consumer, the retailer, and the marketer of the package 5.

The shrink sleeve 90 can closely conform to the contour of the container 10, closure 20, and at least a portion of the tapered portion 80 of the dosing cup 30. By having the shrink sleeve 90 extend over at least a portion of the tapered portion 80 of the dosing cup 30, the shrink sleeve can help restrain the dosing cup 30 from becoming disengaged with the closure 20 by applying an additional longitudinally directed force acting to assist in maintaining engagement between the dosing cup 30 and the closure 20. Further, by employing a tapered dosing cup 30, the maximum dimension of the dosing cup 30 proximal the peripheral rim 60 can be larger than the opening in the shrink sleeve 90 near the top of the package 5. Structured as such, considerable force may be required dislodge the dosing cup 30 from the rim 60 and through the open end of the shrink sleeve 90 at the top of the package 5. The fit of the shrink sleeve 90 to the container 10, closure 29, and portion of the tapered portion 80 of the dosing cup 30 can be the same as the fit of the shrink sleeve to the container in TIDE STAIN RELEASE, marketed by The Procter & Gamble Company, Cincinnati, Ohio, as of Oct. 1, 2010.

The shrink sleeve 90 can be sized and dimensioned such that at least a portion of the closed end 50 or wall 70 is revealed to the consumer. By designing the shrink sleeve 90 as such, the vent opening 100 can be unobstructed by the shrink sleeve 90. This arrangement can provide for a continuous pathway for air-flow communication, from within the container 10 to the consumer's nose, through which scent can be transported from within the container 10 to the consumer's nose. The shrink sleeve 90 can bridge over the peripherally recessed portion 130 of the closure 20.

With a shrink sleeve 90 in place, as described herein, when the consumer squeezes the container 10, a small quantity of perfumed air is expelled through the open end 110 of the container 10, through the orifice 23 of the closure 20, through the peripherally recessed portion 130 of the closure 10 in a conduit defined by the recessed portion 130 and the shrink sleeve 90 bridging over the recessed portion 130, through the dosing volume 32 and out the vent opening 100 to the consumer's nose. The shrink sleeve 90 need not perfectly seal around the dosing cup 30, closure 20, and container 10. Rather, the degree of such seal need only be to a conformity sufficient to result in some of the perfumed air expelled through the open end 110 of the container exiting the package 5 through the vent opening 100 and to provide support for preventing the dosing cup 30 from being prematurely separated from the closure 20. Thus, the shrink sleeve 90 can be imperfectly sealed around the dosing cup 30, closure 20, and container 10. Whether or not some of the perfumed air expelled from the container 10 escapes via pathways other than the vent hole 100 is not critical because of how it is thought that consumers will perceive the package 5 disclosed herein. It is thought that the consumer will naturally choose, or be instructed to choose by user instructions located on the shrink sleeve 90 or via some other instruction, to smell the contents of the package 5 through the vent hole 100, rather than through any imperfection in the seal between the shrink sleeve 90 and the dosing cup 30, because consumers may likely not expect to be able to experience the scent of the contents of the package 5 at a location other than the vent hole 100.

A consumer can sample the scent from the package 5 disclosed herein following a method comprising the steps of squeezing the container 10 to expel perfumed air from the container 10 through the vent opening 100 and smelling the perfumed air.

In one embodiment about 4 ng to about 8 ng of perfume can be expelled from the package 5 when the container 10 is squeezed by hand to expel between about 0.6 mL and about 0.9 mL of perfumed air from within the container 10.

In one embodiment the vent hole 100 can be at or near the closed end 50 of the dosing cup 30. This arrangement might be practical in that if a consumer squeezes the container 10 with the container in the upright position, the location of the vent hole may be conveniently located for the consumer to place immediately beneath her nose so that she can easily detect the scent of the particulate laundry scent additive 80.

The consumer can squeeze the container 10, which will expel a small quantity of perfumed air through the open end 110 of the container 10, through the orifice of the closure 20, possibly via the interface between the spud 24, if present, and the orifice 23, through the peripherally recessed portion 130 of the closure 20, into the dosing volume 32 of the dosing cup 30, and through the vent opening 100, which can allow the consumer to smell the particulate laundry scent additive 40 in the container 10 without having to open the package 5. Given the sensitivity of a typical consumer's nose, only a small volume of perfumed air need be expelled out a vent opening 100 for the consumer to experience the scent of the particulate laundry sent additive 40. Closure 20 may only need to leak a small amount of perfumed air to provide a detectable scent to the consumer. Leakiness can be provided in a flip top cap 120 by molding the flip top cap 120 such that the elements of the cap do not fit together in an air-tight manner for the range of pressure that can be developed in the container 10 by a human hand squeezing the container 10. Similarly, leakiness in a threaded closure 20 can be provided using loose complementary threads that do not fit together in an air-tight manner for the range of pressure that can be developed in the container 10 by a human hand squeezing the container 10.

As shown in FIG. 6, the shrink sleeve 90 can comprise a line of weakness 110 extending at least partially around one or more of the closure 20, the container 10, and the interface between the closure 20 and the container 10. The line of weakness 10 can facilitate the consumer tearing away a portion of the shrink sleeve 90 to free the dosing cup 30 from the package 5 and accessing the particulate laundry scent additive 40 in the container 10.

If the line of weakness 110 extends at least partially around one of the container 10, closure 20, and the interface between the closure 20 and the container 10, when the consumer tears away the portion of the shrink sleeve 90 above the line of weakness 110, she will expose the closure 20 and the dosing cup 30. This will present the dosing cup 30 to the consumer so that she may disengage the dosing cup 30 and she will have the option of removing the closure 20 or opening the flip top cap 120 to dispense the particulate laundry scent additive 40 from the container 10 and into the dosing cup 30.

If the line of weakness 110 extends at least partially around the closure 20 or extends at least partially around an interface between the closure 20 and the container 10, when the consumer tears away the portion of the shrink sleeve 90 above the line of weakness 110, she will expose a portion of the closure 20 and might expose peripherally recessed portion 130 of the closure 20. An arrangement in which the line of weakness 110 is between the peripherally recessed portion 130 of the closure and the container 10 can be practical in that the shrink sleeve 90 can obscure the interface between the closure 20 and container 10. By obscuring this interface, the consumer might employ the closure 20 as desired, for instance by using a flip top cap 120, if provided, rather than removing the closure 20, possibly by unscrewing or unsnapping, to dispense the particulate laundry scent additive 40.

The line of weakness 110 in the shrink sleeve 90 can comprise any structure that renders the shrink sleeve 90 to be frangible along the line of weakness 110. The line of weakness 110 can be perforated. The line of weakness 110 can be a structurally weakened portion of the shrink sleeve 90. The line of weakness 110 can comprise a series of perforations or indentations that selectively weaken a portion of the shrink sleeve 90.

Figure 7:
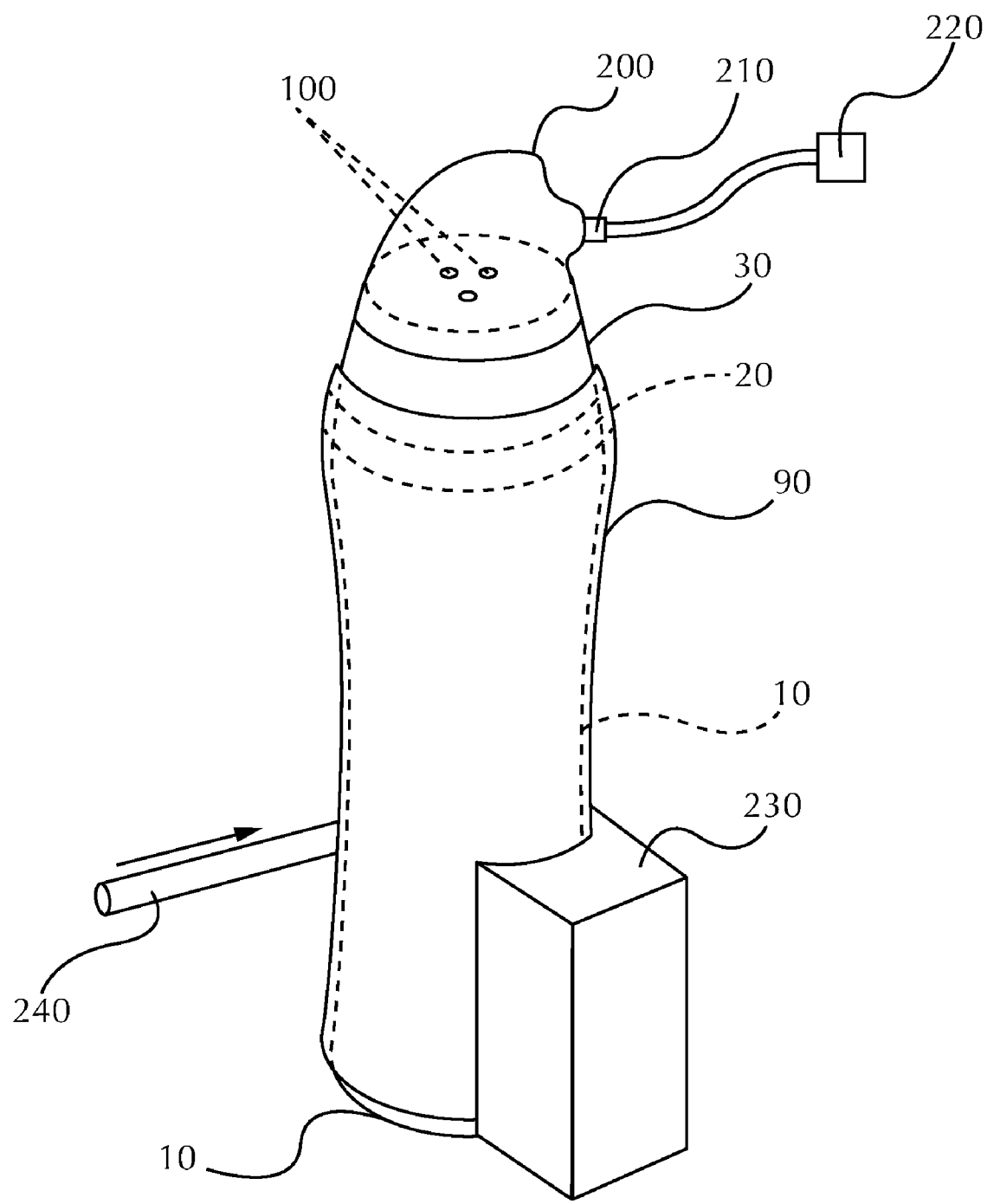
FIG. 7 is a schematic of the Perfume Expulsion Test Method.

The mass of perfume that can be expelled by a consumer squeezing the package 5 is characterized by the Perfume Expulsion Test Method. A schematic of the set up for the Perfume Expulsion Test method is shown in FIG. 7. A 2 L Tedlar bag 200 (Supelco part #24654) is used to capture perfume that is expelled from the vent opening 100 or vent openings 100 of the dosing cup 30. The bottom portion of the Tedlar bag 200 is removed leaving the top portion that has the locking adapter 210. The top portion of the Tedlar bag 200 is sealed to the dosing cup at a location above the shrink sleeve 90 using O-rings such that the Tedlar bag 200 captures perfumed air that is expelled from the vent opening 100 or vent openings 100 of the dosing cup 30 when the container 10 is squeezed. A trap 220 having Tenax-TA 35/60 (Restek cat #25701) is attached to the locking adapter 210.

The container 10 is supported to a height of at least 68 mm with an impression mold 230 that conforms to the contour of the side of the container 10 that is oriented away from the direction from which the squeezing force is applied and is restrained in the direction in which the squeezing force is applied. The impression mold is solid urethane. The height is measured from the portion of the container 10 designed to rest on a surface when the container is displayed to a consumer. The container 10 is laterally restrained at the bottom of the container 10 such that when the squeezing force is applied, the container 10 does not move laterally relative to the direction from which the squeezing force is applied.

A squeezing force of at least 41.5 N is applied to the container 68 mm from the bottom of the container 10 for 5+/−2 seconds. The squeezing force is applied by a loading piston 240 having the dimensions of an Omega 1 inch load cell (LC304-100) or such load cell itself acting as the loading piston. The trap 220 captures perfume from the perfumed air that is expelled from the container 10. The mass of expelled perfume captured by the trap 220 is determined using a GC/FID-MS (Agilent 6890 and 5973 MSD) with a thermal desorption unit (Gerstel MPS2).

The analytical standard used is the Fragrance Materials Test Mix, Restek part #31807, consisting of benzoic acid 1.0%, benzyl salicylate 36.2%, 1,8 cineole 0.5%, trans cinnamaldehyde 0.5%, cinamyl acetate 0.3%, cinnamyl alcohol 0.3%, ethyl butyrate 36.2%, geraniol 0.6%, hydroxycitronellal 5.0%, d-limonene 20.0%, thymol 0.3%, and vanillin 0.1% prepared in methanol (Standard Solution). The Standard Solution is then diluted to 3 concentrations ranging from 0.25 g/L to 0.025 g/L. Standard solutions are then analyzed by GC/MS-FID. The amount injected on column and the sum of the FID area responses are utilized to create the calibration plot with a linear fit. Perfume components released from the package are identified by MS. Quantification is performed by the sum of the FID area responses of perfume components and the linear equation of the calibration plot. The mass of individual perfume components of the perfume expelled from the container 10 through the vent opening 100 or vent openings 100 that occur in a quantity greater than 0.1 ng is determined and sum of the mass of each of these individual perfume components is determined to be the mass of perfume expelled.

Without being bound by theory, it is believed that the mass of perfume of expelled can be greater than about 1 ng when the Perfume Expulsion Test Method is conducted on the container 10 so that a consumer is able to ascertain the scent of the laundry scent additive 40 without opening the package 10 by squeezing the package 5 by hand and expelling perfumed air from the within the container 10 out through the vent opening 100 or vent openings 100. Without being bound by theory, it is believed that the mass of perfume expelled can be greater than about 4 ng when the Perfume Expulsion Test Method is conducted on the container 10 so that a consumer is able to ascertain the scent of the laundry scent additive 40 without opening the package 10 by squeezing the package 5 by hand and expelling perfumed air from the within the container 10 out through the vent opening 100 or vent openings 100.

The particulate laundry scent additive 40 can be an in-the-wash particulate which is something added to the washing machine during a washing cycle. The particulate laundry scent additive 40 can be water soluble.

The particulate laundry scent additive 40 can comprise a plurality of pastilles, wherein each pastille comprises: (a) from about 80% to about 91% by weight of the composition of polyethylene glycol, wherein the polyethylene glycol has a molecular weight from about 5,000 to about 11,000; (b) from about 2% to about 12% by weight of the composition free perfume; and (c) from about 2% to about 12% by weight of the composition of friable perfume microcapsule, wherein the perfume microcapsule comprises encapsulated perfume; wherein each pastille has a mass from about 0.95 mg to about 2 g. For such a particulate laundry scent additive 40, the dosing volume 32 can be sized and dimensioned to hold from about 13 g to about 27 g of the particulate laundry scent additive 40.

The particulate laundry scent additive 40 can comprise free perfume and be essentially free of perfume carriers, such as a perfume microcapsule. The composition can comprise perfume carrier materials (and perfume contained therein). Examples of perfume carrier materials may include cyclodextrin and zeolites.

The particulate laundry scent additive 40 can be manufactured by a pastillation process. The steps of manufacturing according to such process can comprise providing the desired formulation as a viscous material. The viscous material can be provided to a ROTOFORMER, available from Sandvik Materials Technology, at a processing temperature less than about 20 degrees Celsius higher than the onset of solidification temperature. In one embodiment, the perfume microcapsules can be added as a slurry to the polyethylene glycol and free perfume to form the viscous material. The perfume microcapsules can be added as a powder or slurry to the polyethylene glycol and free perfume to form the viscous material. The viscous material is passed through small openings in the ROTOFORMER and onto a moving conveyor surface upon which the viscous material is cooled below the onset of solidification temperature to form a plurality of pastilles. The small openings in the ROTOFORMER can be on a rotatable pastillation roll. Viscous material can be distributed to the small openings by a viscous material distributor. Pastilles can be formed on a ROTOFORMER, available from Sandvik Materials Technology.

The individual particles comprising the particulate laundry scent additive 40 can be pastilles. Pastilles are thought to provide for a particulate laundry scent additive 40 that is easily dispensed from the container 10 the dosing cup 30. The pastilles may be formed into different shapes include tablets, pills, spheres, and the like. A pastille can have a shape selected from the group consisting of spherical, hemispherical, compressed hemispherical, lentil shaped, and oblong. Lentil shaped refers to the shape of a lentil bean. Compressed hemispherical refers to a shape corresponding to a hemisphere that is at least partially flattened such that the curvature of the curved surface is less, on average, than the curvature of a hemisphere having the same radius. A compressed hemispherical pastille can have a ratio of height to diameter of from about 0.01 to about 0.4, alternatively from about 0.1 to about 0.4, alternatively from about 0.2 to about 0.3. Oblong shaped refers to a shape having a maximum dimension and a maximum secondary dimension orthogonal to the maximum dimension, wherein the ratio of maximum dimension to the maximum secondary dimension is greater than about 1.2. An oblong shape can have a ratio of maximum dimension to maximum secondary dimension greater than about 1.5. An oblong shape can have a ratio of maximum dimension to maximum secondary dimension greater than about 2. Oblong shaped particles can have a maximum dimension from about 2 mm to about 6 mm, a maximum secondary dimension of from about 2 mm to about 4 mm.

In alternative embodiments of any of the formulations disclosed herein, each individual pastille can have a mass from about 0.95 mg to about 2 g, alternatively from about 10 mg to about 1 g, alternatively from about 10 mg to about 500 mg, alternatively from about 10 mg to about 250 mg, alternatively from about 0.95 mg to about 125 mg, alternatively combinations thereof. In a plurality of pastilles, individual pastilles can have a shape selected from the group consisting of spherical, hemispherical, compressed hemispherical, lentil shaped, and oblong.

An individual pastille may have a volume from about 0.003 $cm^3$ to about 0.15 $cm^3$. A plurality of pastilles may collectively comprise a unit dose for dosing to a laundry washing machine or laundry was basin. A single unit dose of the pastilles may comprise from about 13 g to about 27 g, alternatively from about 14 g to about 20 g, alternatively from about 15 g to about 19 g, alternatively from about 16 g to about 18 g, alternatively combinations thereof. The pastilles in a unit dose can have a maximum dimension less than about 1 centimeter.

The particulate laundry scent additive 40 can comprise 87.38% by weight polyethylene glycol, 4.41% by weight perfume microcapsules, 8.20% by weight free perfume, and 0.018% by weight dye.

The particulate laundry scent additive 40 can comprise perfume microcapsules which are perfume oil encapsulated in a microcapsule. The perfume microcapsules can be friable perfume microcapsules and can be moisture activated perfume microcapsules. The microcapsules can comprise a melamine/formaldehyde shell. Encapsulated perfume and/or PMC may be obtained from Appleton, Quest International, or International Flavor & Fragrances, or other suitable source. In one embodiment, the perfume microcapsule shell is coated with polymer to enhance the ability of the perfume microcapsules to adhere to fabric.

The particulate laundry scent additive 40 can comprise dye. The dye may include those that are typically used in laundry detergent or fabric softeners. The composition can comprises from about 0.001% by weight to about 0.1% by weight, alternatively from about 0.01% by weight to about 0.02% by weight, alternatively combinations thereof, of dye by weight of the particulate laundry scent additive 40. An example of a dye includes LIQUITINT BLUE BL from Millikin Chemical.

In one embodiment, the particulate laundry scent additive 40 can comprise an antioxidant to reduce oxidation of the laundry scent additive 40 while the laundry scent additive is retained in the package 10. An antioxidant can be beneficial because the package 5 described herein, the particulate laundry scent additive 40 in the container 10 can be in fluid communication with the external environment, which could promote adverse oxidation of the particulate laundry scent additive 40.

All percentages and ratios used herein are by weight of the total composition and all measurements made are at 25° C., unless otherwise designated. An angular degree is a planar unit of angular measure equal in magnitude to 1/360 of a complete revolution.

While particular embodiments of the present invention have been illustrated and described, it would be obvious to those skilled in the art that various other changes and modifications can be made without departing from the spirit and scope of the invention. It is therefore intended to cover in the appended claims all such changes and modifications that are within the scope of this invention.

All documents cited are, in relevant part, incorporated herein by reference; the citation of any document is not to be construed as an admission that it is prior art with respect to the present invention.

What is claimed is:

1. A package comprising;
   a container, said container having an open end and containing a particulate laundry scent additive, said particulate laundry scent additive comprising free perfume;
   a closure engaged with said open end of said container, said closure having a peripherally recessed portion;
   a dosing cup comprising a closed end, a peripheral rim, and a wall extending from said closed end to said peripheral rim to define a dosing volume, wherein said dosing volume is in fluid communication with said peripherally recessed portion of said closure, wherein said peripheral rim is releasably engaged with said closure, wherein said dosing cup has a longitudinal axis, wherein at least a portion of said dosing volume extends further away from said longitudinal axis than at least a portion of said peripherally recessed portion of said closure, wherein said wall comprises a tapered portion inwardly tapered towards said longitudinal axis, wherein said dosing cup comprises a vent opening in said closed end or in said wall, wherein said vent opening is sized and dimensioned to retain said particulate laundry scent additive; and
   a shrink sleeve wrapping around said container and said closure and at least a portion of said tapered portion of said dosing cup wall thereby providing a redundant mechanism of engagement between said dosing cup and said container, wherein said vent opening is unobstructed by said shrink sleeve, wherein said shrink sleeve bridges over at least a portion of said peripherally recessed portion of said closure.

2. The package according to claim 1, wherein said shrink sleeve comprises a line of weakness extending at least partially around one or more of said closure, said container, and an interface between said closure and said container.

3. The package of claim 2, wherein said line of weakness is perforated.

4. The package of claim 1, wherein said particulate laundry scent additive is an in-the-wash particulate.

5. The package of claim 1, wherein said particulate laundry scent additive comprises a plurality of perfume microcapsules.

6. The package of claim 1, wherein said vent opening is located at or near said closed end.

7. The package of claim 1, wherein said closure is threadably engaged with said container.

8. The package of claim 2, wherein said line of weakness extends at least partially about said closure.

9. The package of claim 1, wherein said closure has a flip top cap.

10. The package of claim 1, wherein said dosing cup comprises a plurality of vent openings sized and dimensioned to retain said particulate laundry scent additive.

11. The package of claim 1, wherein said particulate laundry scent additive is water soluble.

12. The package of claim 1, wherein said particulate laundry scent additive comprises and antioxidant.

13. The package of claim 1, wherein a mass of perfume expelled from the container when tested by the Perfume Explusion Test Method is more than about 1 ng.

14. A method of sampling the particulate laundry scent additive from the package of claim 1 comprising the steps of squeezing said container to expel perfumed air from said container through said vent opening and smelling said perfumed air.

* * * * *